United States Patent
Ganot

[11] Patent Number: 6,164,723
[45] Date of Patent: Dec. 26, 2000

[54] VEHICLE SEAT FITTED WITH A PIVOTING MECHANISM, AND MEMORIZATION MECHANISM FOR SUCH A SEAT

[75] Inventor: Denis Ganot, Caen, France

[73] Assignee: Bertrand Faure Equipements SA, Boulogne, France

[21] Appl. No.: 09/286,163

[22] Filed: Apr. 5, 1999

[30] Foreign Application Priority Data

Apr. 9, 1998 [FR] France ................... 98 04463

[51] Int. Cl.[7] ........................................ B60N 2/02
[52] U.S. Cl. ........................... 297/378.12; 297/367
[58] Field of Search ................ 297/367, 378.12, 297/362, 378.1, 353, 361.1

[56] References Cited

U.S. PATENT DOCUMENTS

| 5,216,936 | 6/1993 | Baloche ................................... 74/527 |
| 5,611,599 | 3/1997 | Baloche et al. ........................ 297/367 |
| 5,820,219 | 10/1998 | Rohee . |
| 5,857,746 | 1/1999 | Barrere et al. . |
| 5,881,854 | 3/1999 | Rougnon-Glasson . |
| 5,984,413 | 11/1999 | Baloche et al. . |
| 6,007,152 | 12/1999 | Kojima et al. . |
| 6,007,153 | 12/1999 | Benoit et al. . |

FOREIGN PATENT DOCUMENTS

| 0 502 774 | 9/1992 | European Pat. Off. . |
| 0 694 434 | 1/1996 | European Pat. Off. . |
| 1 580 123 | 8/1970 | Germany . |
| 2 218 627 | 11/1989 | United Kingdom . |

OTHER PUBLICATIONS

French Preliminary Search Report dated Dec. 15, 1998, Appl. No. FR 9804463.

*Primary Examiner*—Milton Nelson, Jr.
*Attorney, Agent, or Firm*—Marshall, O'Toole, Gerstein, Murray & Borun

[57] ABSTRACT

A seat, the back of which is connected to the seat part by a pivot including two webs able to be fixed by toothed inserts controlled by a cam. In order to allow the folding down of the seat back forwards, then the replacing of this back into its initial position, the pivoting cam is connected to an external memorisation mechanism, which comprises a control part connected to this cam by a lost motion mechanical connection adapted so that the activation of the cam does not move the activating part, and so that the activation of the memorisation mechanism drives the movement of the cam to its unlocked position.

13 Claims, 5 Drawing Sheets

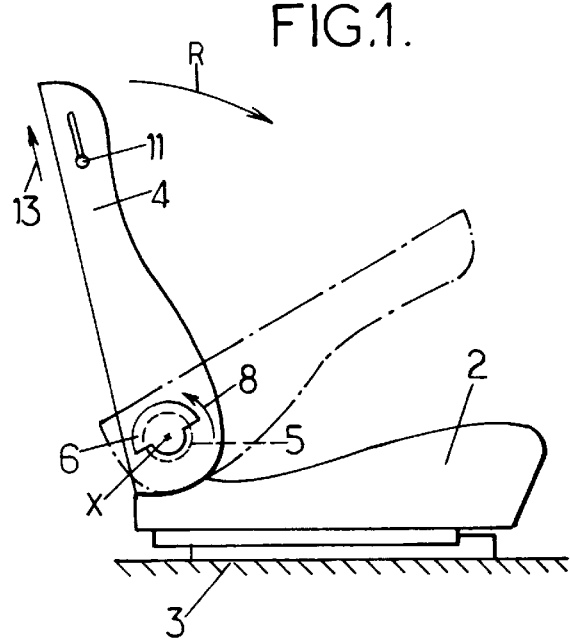
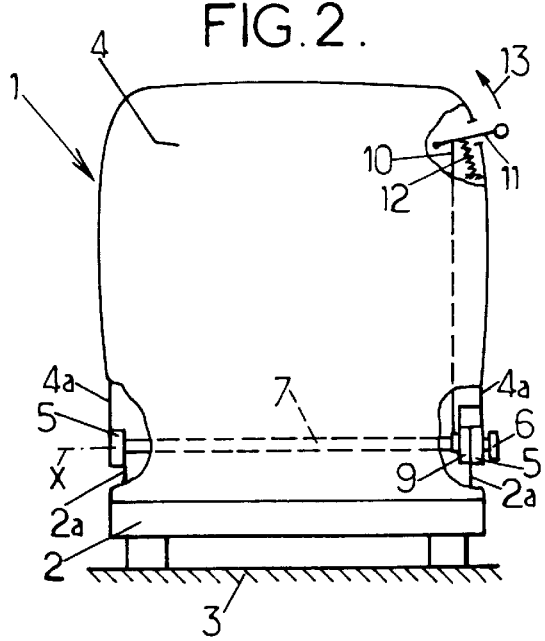
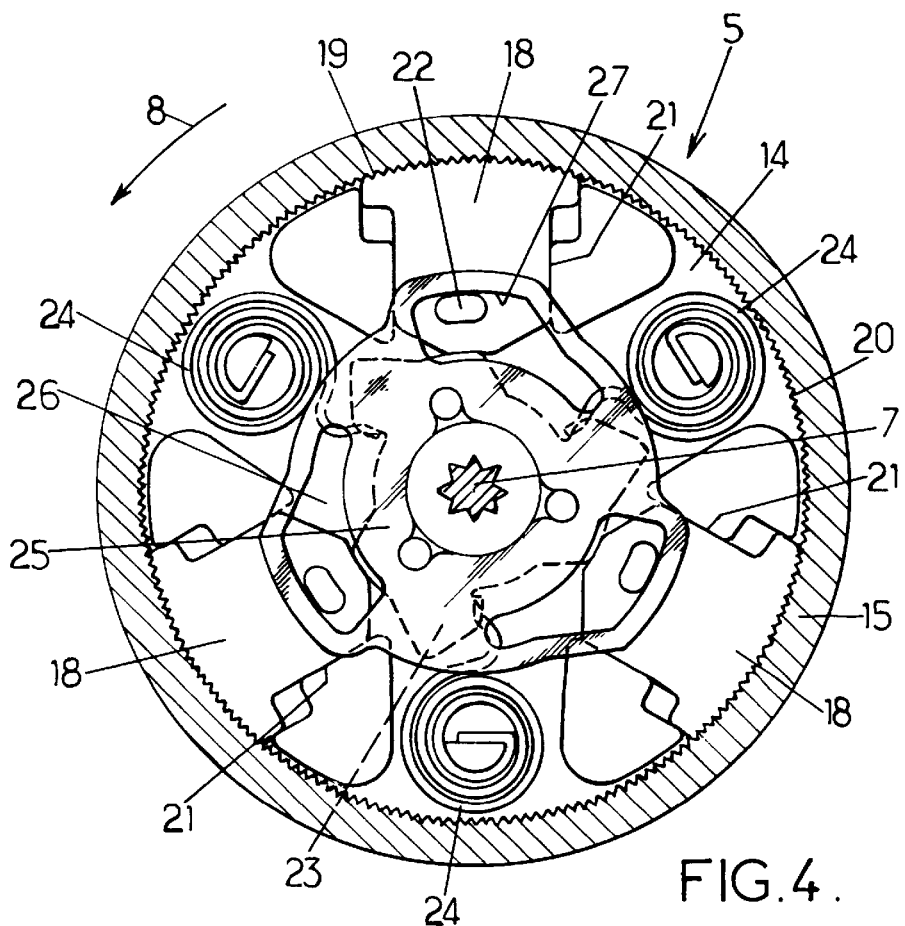

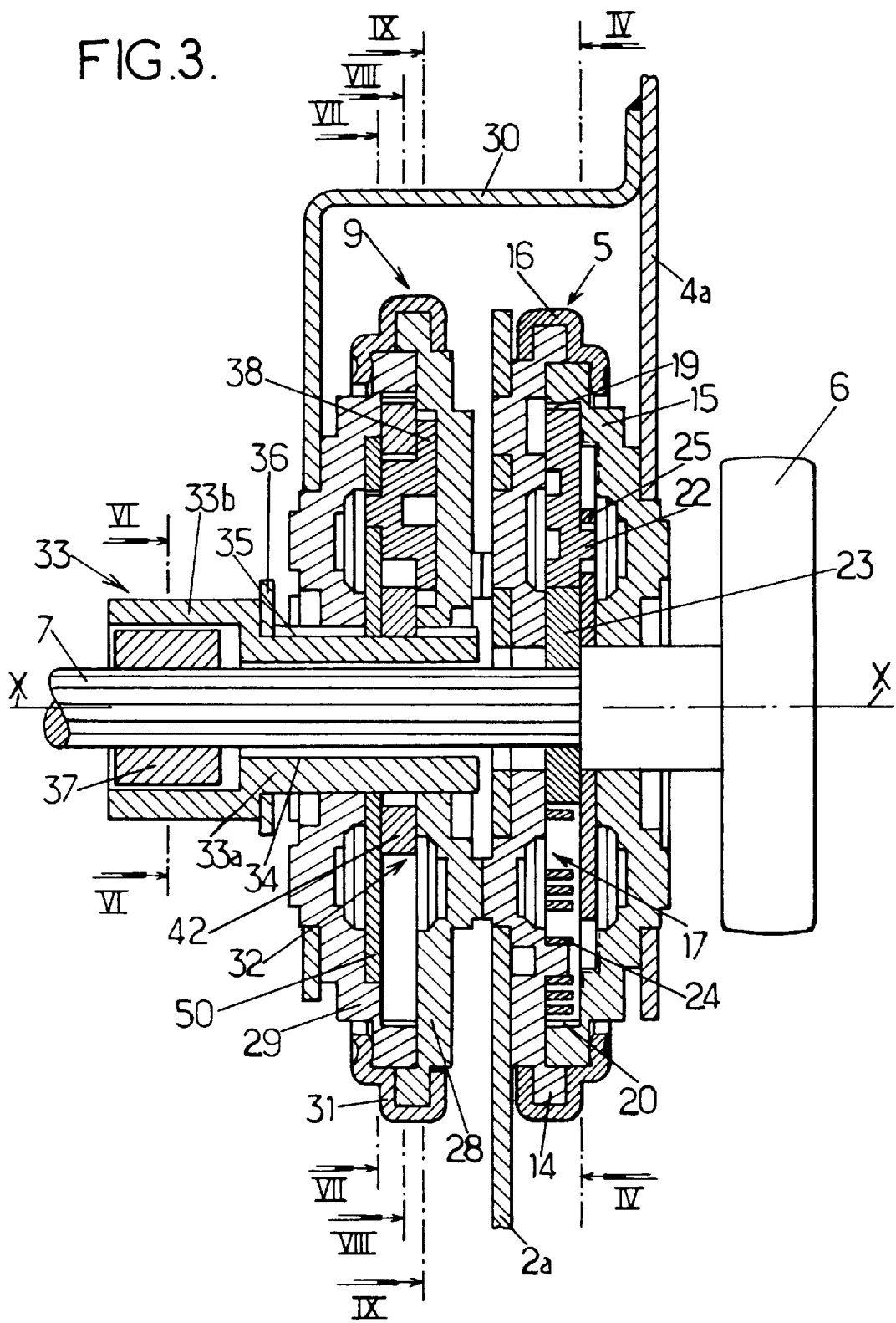

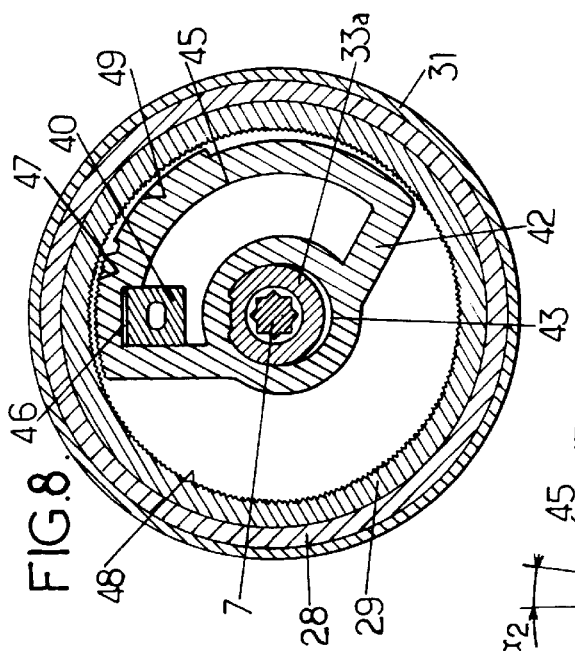
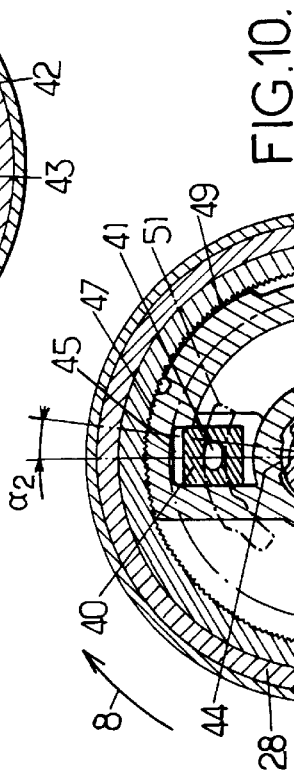
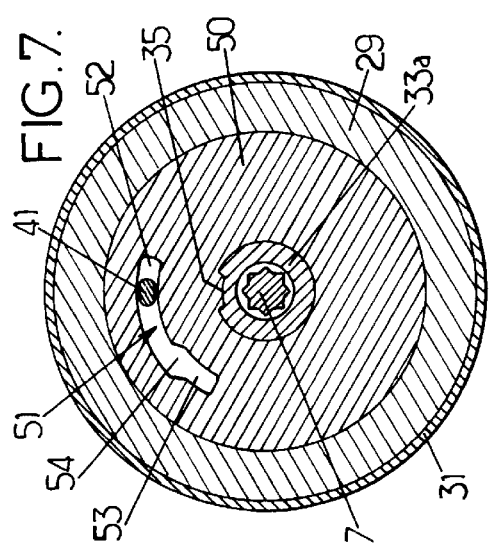
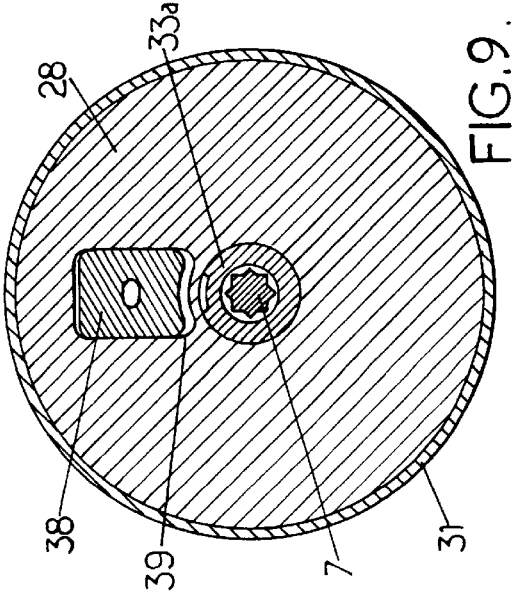
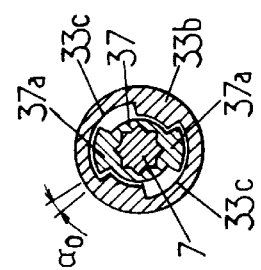

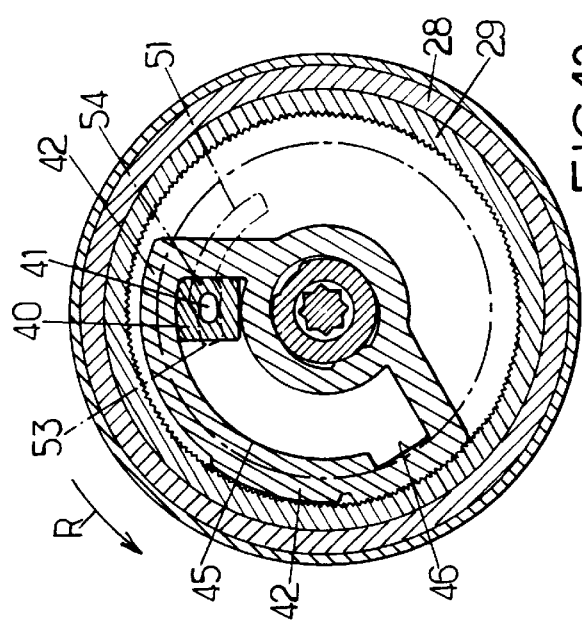
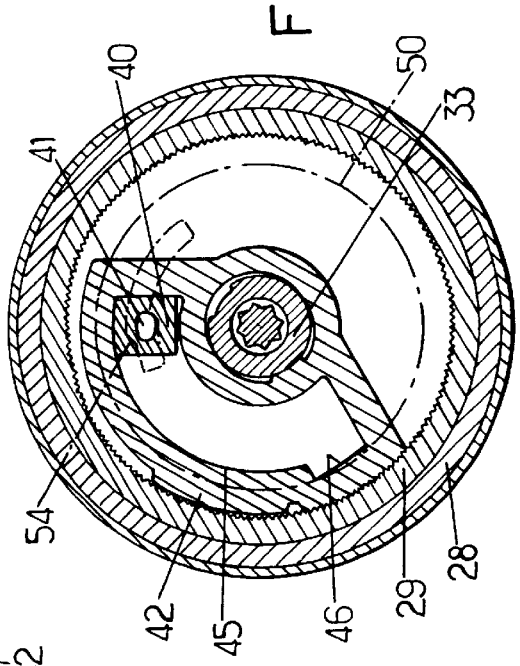
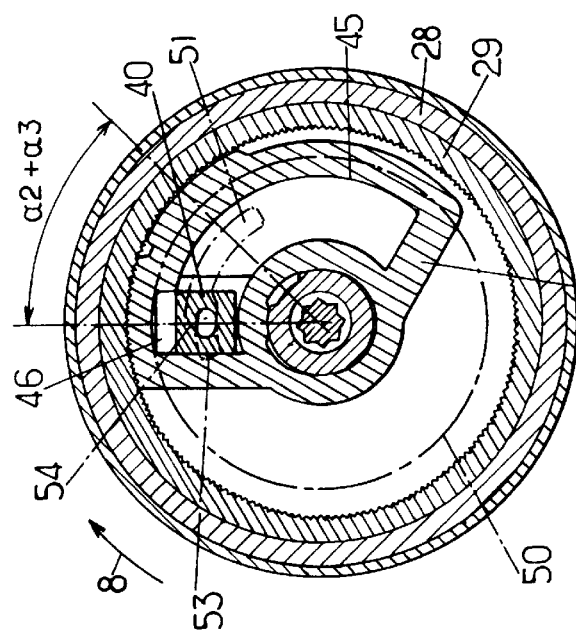
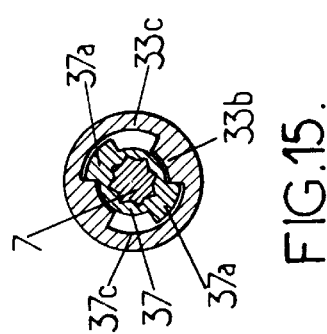
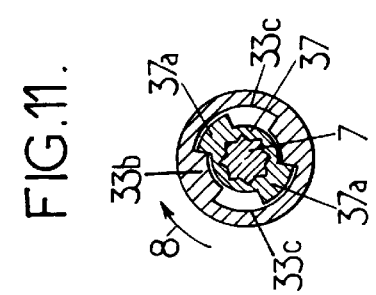

VEHICLE SEAT FITTED WITH A PIVOTING MECHANISM, AND MEMORIZATION MECHANISM FOR SUCH A SEAT

FIELD OF THE INVENTION

The present invention relates to vehicle seats fitted with pivoting mechanisms, and with memorisation mechanisms for such seats.

More particularly, the invention concerns a vehicle seat comprising:

first and second seat components pivoting mounted relative to one another about a rotational axis, at least one first pivoting mechanism which comprises a locking device movable between, on the one hand, a locked position preventing the relative pivoting between the first and second seat components, and on the other hand, an unlocked position allowing free pivoting between the first and second seat components, this locking device being controlled by a first operating part pivoting about said rotational axis and able to be activated (directly or not) by a user, this first operating part being assisted into an angular neutral position where said first operating part places the locking device into its locked position, and the first operating part being movable in an activating angular direction to an activating angular position where the first operating part places the locking device into its unlocked position, the neutral and activating angular positions of the first operating part being fixed relative to the first seat component.

and a memorisation mechanism which is movable between, on the one hand, a neutral position where said memorisation mechanism is adapted to not interfere with the relative pivoting of the first and second seat components, and on the other hand, an active position where said memorisation mechanism is adapted to:

allow a free pivoting of the first seat component relative to the second seat component, only in a first angular direction from the last adjusted relative position of these two seat components, then to allow a free pivoting of the first seat component relative to the second seat component, in a second angular direction opposite to the first angular direction, only as far as said last adjusted relative position of these two seat components, the memorisation mechanism being controlled by a second operating part pivoting mounted about the rotational axis and able to be activated (directly or not) by a user, this second operating part being assisted towards an angular neutral position where said second operating part places the memorisation mechanism into its neutral position, and the second operating part being movable in said activating angular direction to an angular position where said second operating part places the memorisation mechanism into its active position.

BACKGROUND OF THE INVENTION

The document EP-A-0 694 434 describes a seat of this type, which is particularly intended to fit the front places of two side door vehicles, and in which the first and second seat components are the seat part and the seat back.

This seat of the prior art is provided with a pivoting mechanism with toothed inserts which allow:

the seat back position to be adjusted, and, for example when it is wished to access the rear vehicle places, to tip the seat back forwards, then afterwards to automatically re-lock it in the position previously adjusted by the user.

The pivoting mechanism of this seat comprises first and second side webs, and toothed inserts which are sliding mounted relative to the first web and which mesh with teeth themselves movable relative to the second web, these teeth being able to be fixed to the second web by means of other toothed inserts.

In this case, the two webs of the pivoting mechanism are therefore connected together by means of two stages of toothed inserts, which tends to decrease the strength of the pivoting mechanism, or requires the weight and the cost of this mechanism to be increased in order to obtain a high mechanical strength.

Furthermore the pivoting mechanism is then a specific mechanism, therefore produced in relatively small numbers and consequently relatively expensive relative to a standard pivoting mechanism.

OBJECTS AND SUMMARY OF THE INVENTION

The object of the present invention is to overcome these drawbacks.

To this end, according to the invention, a seat of the type in question is mainly characterised in that the memorisation mechanism is in the form of a housing distinct from the first pivoting mechanism, in that the first and second operating parts are connected together by a lost motion mechanical connection which is adapted:

to leave the second operating part fixed when the first operating part is acted upon to move it into its activating position, and to drive the first operating part from its neutral position into its activating position when the second operating part is acted upon to move it from its neutral position into its active position, and in that the angular neutral and activating positions of the second operating part are fixed relative to the first seat component.

By means of these arrangements, when the user of the seat wishes to adjust the inclination of its back, he acts on the first operating part, which unlocks the first pivoting mechanism.

Because of the lost motion mechanical connection between the first and second operating parts, and taking account of the fact that the two operating parts have fixed neutral and activating positions relative to the same seat component, the second operating part then stays in the neutral position, so that the memorisation mechanism is itself in its neutral state and does not interfere with the relative pivoting of the first and second seat components.

On the other hand, when the user of the seat wishes to rapidly pivot the second seat component into the first angular position (for example, if it is a matter of the seat back, to fold down this back frontward to the maximum) he acts on the second operating part, which not only unlocks the first pivoting mechanism, but also allows the memorisation mechanism to pass into its memorisation position, by limiting the relative pivoting movement of the first and second seat component so that the second seat component may finally return into its initial position relative to the first seat component.

It will be noted that the first pivoting mechanism of the seat according to the invention may be of standard construction, which allows if the need arises the same pivoting mechanisms to be used for more or less all types of seat for which the back is adjustable by direct user action on said back, whether this seat can be folded down frontward or not to access the rear places of the vehicle.

Because of this possibility of standardisation, the invention allows high productivity gains and consequently an overall decrease in cost of the seats.

Furthermore, the invention does not require the first pivoting mechanism to have two stages of toothed inserts, which allows the user a simple and strong first pivoting mechanism to be used. In any case, the mechanical strength of the first pivoting mechanism is independent of the presence or not of the memorisation mechanism.

In preferred versions of the invention, use may possibly be made moreover of one and/or the other of the following arrangements:

the memorisation mechanism includes:
   first and second webs fixed respectively with the first and second seat components, these webs being pivoting mounted relative to each other about the rotational axis of the back,
   a memorisation device which is controlled by the second operating part and which is mechanically connected with the first and second webs of the memorisation mechanism, this memorisation device being movable between:
      on the one hand, a neutral position which corresponds with the neutral position of the memorisation mechanism and in which the memorisation device defines a relative memorisation angular position between the first and second webs of the memorisation mechanism,
      and on the other hand and activating position which corresponds to the activating position of the memorisation mechanism,
the memorisation device being adapted to hold the second operating part in its activating position as soon as this second operating part has reached its activating position, while the two webs of the memorisation mechanism are not in their relative memorisation position;
   the second web of the memorisation mechanism is fixed to teeth which extend over at least one circular arc centred on the rotational axis, the operating part of the memorisation mechanism comprising a cam, and the memorisation device including:
      at least one memorisation insert provided with teeth suitable to engage with the teeth of the second web of the memorisation mechanism, this insert being movable between, on the one hand, an engagement position where the teeth of the memorisation insert mesh with the teeth of the second web, and on the other hand, a withdrawn position where the memorisation insert does not engage with the teeth of the second web, the movement of the memorisation insert being controlled by the cam, which is adapted to:
         allow said memorisation insert to be placed in its withdrawn position when said cam is in its neutral position,
         and to place the memorisation insert into its engagement position when said cam is in its activating position,
      disengagement means to place the memorisation insert into its withdrawn position when the cam is in its neutral position,
      a guide part radially movable relative to the first web of the memorisation mechanism between, on the one hand, a first position in which said guide part engages with the memorisation insert to allow only a radial sliding of this memorisation insert, and on the other hand, a second position in which the guide part allows a rotation of the memorisation insert about the rotational axis of the back when said memorisation insert is in its engagement position, the memorisation insert and the guide part defining said relative angular position of memorisation of the first and second webs (28, 29) of the memorisation mechanism when the guide part (38) is in its first position, said guide part engaging by abutment with the memorisation insert to allow only a rotation of said memorisation insert in said first angular direction in relation to the first web, from said memorisation position of the memorisation insert when the guide part is in its second position, and the memorisation insert being adapted to prevent the guide part from returning into its first position when the first and second webs are no longer in their angular memorisation position,
      and driving means mechanically connected with the cam, to place the guide part into its first position when the cam is in an angular position between its neutral position and its activating position, and to place said guide part into its second position at least when the second cam is in its activating position.
the cam and the lost motion mechanical connection are adapted so that the memorisation insert is placed in its engagement position before the first operating part attains its activating position when the cam is acted upon to move it to its activating position;
the angular activating direction is opposite to the first angular direction;
the guide part is vertically movable relative to the first web and engages with the memorisation insert to allow a vertical sliding of this memorisation insert when the cam is moved between its neutral position and its activating position, the memorisation insert teeth being normally directed upwards and the means of disengagement including at least the weight of the memorisation insert;
the guide part includes a peg which is engaged in a radial notch integral with the memorisation insert when the second cam is in its neutral position, this radial notch communicating with a circular arc cut-out which is also integral with the memorisation insert and which is centred on the rotational axis, which circular arc cut-out extends in an opposite angular direction to the activating angular direction from an end corresponding with the radial notch;
the memorisation insert is in the shape of a rigid plate which extends perpendicularly to the rotational axis, the radial notch and the circular arc cut-out being formed in this rigid plate;
the driving means of the guide part include a runner which is integral with the cam and along which slides the guide part;
said runner is a cut-out made in a small rigid plate which extends perpendicularly to the rotational axis, the guide part comprising a projecting stud which is guided in said cut-out;
the cam has a circular external surface associated with an indentation, the memorisation insert comprising an internal tooth which is placed in said indentation when the cam is in its neutral position, and which is in contact with the external circular surface of the cam when said cam is in its angular activating position;

the seat comprises a seat part and a back which constitute respectively the first and second seat components;

the seat comprises first and second opposite sides, the first pivoting mechanism being placed on the first side of the seat, and the seat comprising besides, on its second side, a second pivoting mechanism which comprises a locking device movable between, on the other hand, a locked position preventing the relative pivoting between the first and second seat components, and on the other hand, an unlocked position allowing free pivoting between the first and second seat components, this locking device being controlled by a third operating part pivoting about said rotational axis and able to be activated by a user, this third operating part being assisted to an angular neutral position where said third operating part places the locking device into its locked position, and the third operating part being movable to an activating angular position where said third operating part places the locking device into its unlocked position, the neutral and activating angular positions of the third operating part being fixed relative to the first seat component, the second pivoting mechanism being synchronised with the first pivoting mechanism by means of a transverse connecting bar, so that the first and third operating parts are simultaneously, either in their neutral position, or in their activating position, and the memorisation mechanism engaging with the connecting bar by means of said lost motion mechanical connection.

Furthermore, the object of the invention is also a memorisation mechanism for a seat such as defined above.

BRIEF DESCRIPTION OF THE DRAWINGS

Other characteristics and advantages of the invention will appear during the following description of one of its versions, given as a non-restrictive example, in comparison with the enclosed drawings.

In the drawings:

FIGS. 1 and 2 are diagrammatic views, respectively side and rear, of a seat according to one version of the invention;

FIG. 3 is a vertical section, viewed from the rear, of one of the pivoting mechanisms and of the memorisation mechanism belonging to the seat of FIGS. 1 and 2, FIG. 4 is a section view of the pivoting mechanism of FIG. 3, in its neutral position, the section being taken along the broken line IV—IV of FIG. 3, FIG. 10 is a view similar to FIG. 8 in which the shape of the small plate shown in FIG. 7 has been indicated in dot and dash lines, said FIG. 10 showing the memorisation mechanism at the start of the activation of its operating lever, FIGS. 11 and 12 are views similar to FIGS. 6 and 10 respectively, showing the memorisation mechanism during the activation of its operating lever, when this lever is in its end of travel position but the back is still in its normal use position, FIG. 13 is a view similar to FIG. 19, showing the memorisation mechanism when the back is folded down to the maximum forwards position, the operating lever of the memorisation mechanism being still in its activating position, and FIGS. 14 and 15 are views similar to FIGS. 10 and 6 respectively, showing the memorisation mechanism when the back is folded down to the maximum forwards, the operating lever of the memorisation mechanism being released.

MORE DETAILED DESCRIPTION

Figure 5:
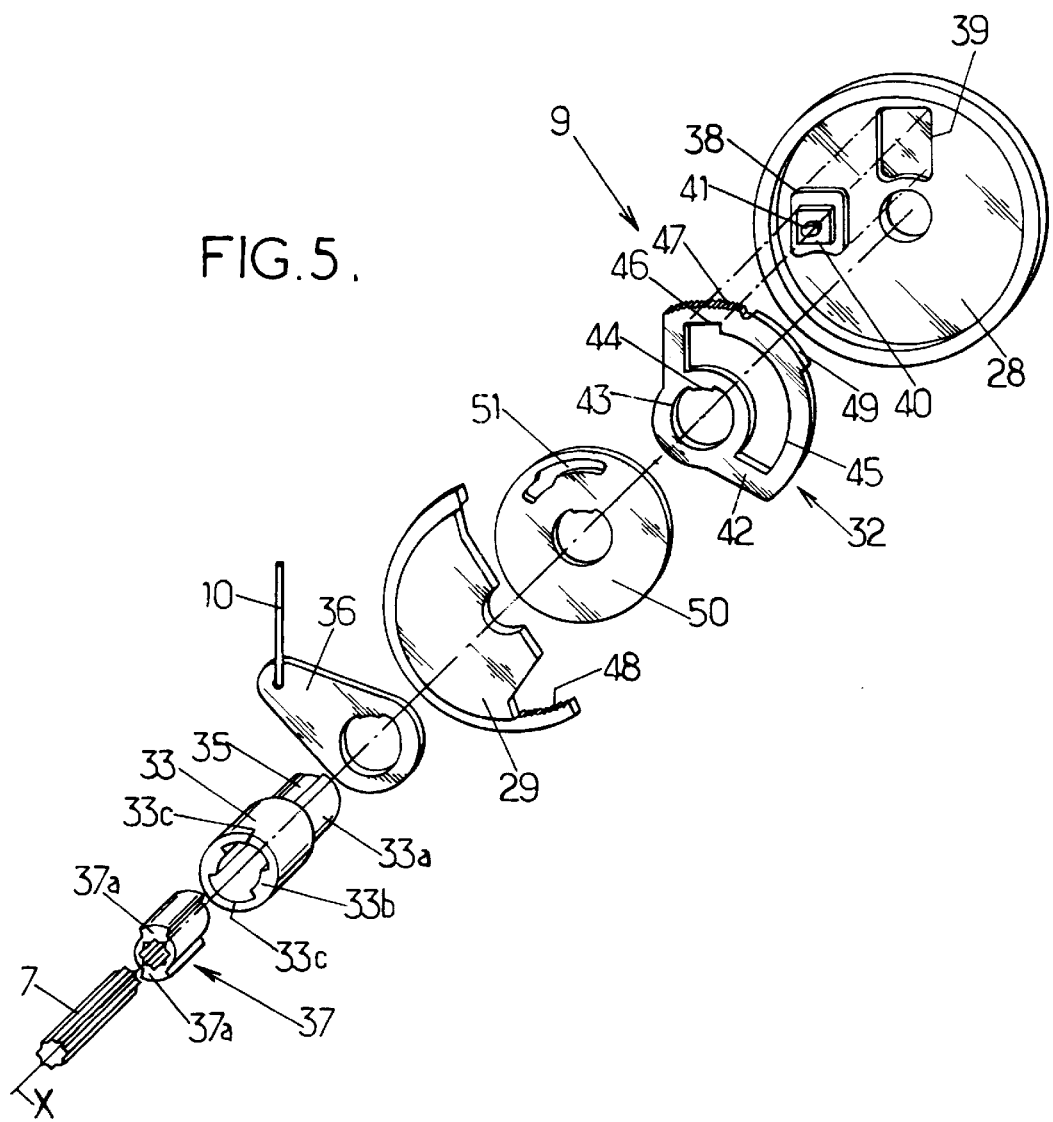
FIG. 5 is an exploded and partially cut away diagrammatic view, of the memorisation mechanism of FIG. 3, FIGS. 6 to 9 are sectional views of the memorisation mechanism of FIG. 3, in its neutral position, the sections being taken respectively along the lines VI—VI, VII—VII, VIII—VIII and IX—IX of FIG. 3.

In the different figures the same references designate identical or similar components.

As shown diagrammatically in FIGS. 1 and 2, the invention concerns a vehicle seat 1, particularly a front seat of an automobile, which comprises, on the other hand, a seat part 2 mounted on the vehicle floor 3, and on the other hand, a back 4 pivoting mounted on the seat part 2 about a transverse horizontal axis X.

More exactly, the rigid frame 4a of the back is connected to the rigid frame 2a of the seat part, on each side of the seat, by two identical or similar pivoting mechanisms 5 which are controlled by a same handle 6. This handle is integral with a rigid metallic connecting bar 7 which connects together the two pivoting mechanisms 5 and which extends along the axis X.

The activation of the handle 6 in the angular direction 8 shown in FIG. 1 allows the two pivoting mechanisms 5 to be unlocked simultaneously, so that the user of the seat can adjust the inclination of the back 4 by acting directly on this back, said back being generally assisted forwards by means of a spring (not shown).

Furthermore, one of the two pivoting mechanisms 5 is connected to a memorisation mechanism 9 which is connected, by means of a metallic rod 10 or other mechanical connection, to a lever 11 pivoting mounted or if the need arises sliding mounted on the back 4.

This lever 11 is assisted to its bottom neutral position, by a spring 12 or other similar means, and it can be moved upwards by a user, in the direction of the arrow 13.

During activation of the lever 11 in the direction of the arrow 13, as will be explained below, the two pivoting mechanisms 5 are unlocked allowing the back 4 to be tipped to the maximum forward position in the direction of the arrow R, to the position shown in dot and dash lines in FIG. 1.

The memorisation mechanism 9 then holds the pivoting mechanisms 5 in their unlocked positions even after the lever 11 is released, as long as the back 4 has not been raised into its initial position, i.e. into the last angular position adjusted by the user.

In this way, the memorisation mechanism 9 guarantees that the back is only re-locked into its initial angular position when it is folded forwards then set upright.

The means which, in the example considered, allow this result to be obtained are now going to be described in more detail below.

First of all, as regards the two pivoting mechanisms 5, FIGS. 3 and 4 will be referred to, where one of these two mechanisms can be clearly seen.

As shown in these FIGS. 3 and 4, each of the two pivoting mechanisms 5 comprises:

a so-called fixed metallic web 14, which extends perpendicularly to the axis X and which in the considered example is fixed to the rigid frame 2a of the seat part, a so-called movable metallic web 15, which extends perpendicularly to the axis X and which in the example considered is fixed to the frame 4a of the back, a metallic ring 16, which is crimped on the perimeter of the fixed and movable webs delimiting with them a circular closed casing, and a locking device with inserts 17, which is contained in said casing and which is adapted to immobilise the movable web 15 relative to the corresponding fixed web 14 while the handle 6 is in its neutral position.

As shown in FIGS. 3 and 4, the locking device 17 includes, in the example considered:

three metallic locking inserts 18, which are placed at 120° to each other and which each have external teeth 19 adapted to mesh with internal circular teeth 20 provided in the movable web 15, each of these inserts being radially sliding mounted in a guide 21 which is integral with the corresponding fixed web 14, so that the inserts are movable between, on the one hand, an engagement position where the teeth 19 of these inserts mesh with the teeth 20 of the corresponding movable web in order to lock the pivoting mechanism 5, and on the other hand, a withdrawn position where the inserts 18 do not engage the teeth 20 of the movable web, each insert comprising furthermore a peg 22 which projects axially towards the movable web 15, a metallic cam 23 or other operating part, which is fixed to the connecting bar 7, in the example considered by fitting in the splines of said connection bar, springs 24 which are mounted on the fixed web 14 and which assist the cam 23 to a neutral position where it places the inserts 18 into their engagement position, said cam being able to pivot in the angular direction 8 allowing the inserts 18 to slide towards their withdrawn position thus unlocking the pivoting mechanism 5, and a small rigid metallic plate 25 which is rigidly connected to the cam 23 and which extends radially between said cam and the movable web 15 partially covering the inserts 18 , this small plate comprising three cut-outs 26 in which the pegs 22 of the inserts are engaged, each of these pegs engaging with a cam edge 27 which delimits the corresponding cut-out radially outwards and which is shaped to move the corresponding insert radially inwards when the cam rotates in the angular direction 8.

In this way, the locking inserts 18 of the two pivoting mechanisms 5 are simultaneously, either in their withdrawn position when the corresponding cams 23 are in their neutral position, or in their engagement position when the cams 23, the handle 6 and the connection bar 7 have pivoted through at least one angular movement α1 in the angular direction 8 from the neutral position, this first angular movement α1 being able to have a value of, for example, about 27°.

Furthermore, regarding the memorisation mechanism 9, reference will be made first of all to FIG. 3 and to FIGS. 5 to 9, where this mechanism is clearly visible in its neutral position.

As can be seen in these figures, the memorisation mechanism 9 comprises, in the example considered here:

a so-called fixed metallic web 28, which extends perpendicularly to the rotational axis X of the back and which, in the example considered, is fixed to the fixed web 14 of one of the two pivoting mechanisms 5 by welding or other fixing means, the fixed web 28 being in a more general way fixed to the same seat frame as the fixed web 14, i.e. the frame 2a of the seat part in the example considered, a so-called movable metallic web 15, which also extends perpendicularly to the axis X and which is fixed to the same seat frame as the movable web 15 of the pivoting mechanism 5, in this case the frame 4a of the back, the fixing of the movable web 29 of the memorisation mechanism on the frame 4a being for example obtained by means of a metallic clip 30 added onto said frame 4a (see FIG. 3), a metallic ring 31, which is crimped onto the perimeter of the fixed and movable webs 28, 29 delimiting with them a closed circular casing, a memorisation device 32, contained in said casing, an activating tubular casing 33 or other operating part, which extends along the rotational axis X and which is passed through by a central bore 34 in which the connecting bar 7 pivots freely, the tubular casing 33 comprising:

on the one hand, a body 33a forming a cam, which is placed in said casing and which has a circular cylindrical external surface provided with an axial groove 35 with a flat bottom and angled edges, and on the other hand, a widened head 33b placed outside said casing opposite the pivoting mechanism 5 connected to the memorisation mechanism, a small rigid rod 36, which is fixed to the tubular casing 33, for example by fitting without clearance on this tubular casing and by engaging with the axial groove 35 of said tubular casing, the small rod 36 extending in a plane perpendicular to the rotational axis X, so far as a free end to which is coupled the rod 10 itself connected to the aforementioned control lever 11, so that activation of the lever 11 in the direction of the arrow 13 (FIGS. 1 and 2) causes pivoting of the small rod 36 and the activating tubular casing 33 in the direction of the arrow 8 (FIG. 5), and an activating part 37 (see FIGS. 5 and 6) in the shape of a butterfly, which is placed inside the widened head 33b of the activating tubular casing and which comprises two external projecting flanges 37a penetrating with angular clearance into circular arc indentations 33c made inside the widened head 33b of the activating tubular casing.

The activating part 37 is engaged without clearance on the connecting bar 7, for example by fitting in the axial splines of this connection bar, and the flanges 37a of said activating part engage with the indentations 33c of the activating tubular casing so that, when the activating tubular casing 33 is in its neutral position imposed by the level 11:

the connecting bar 7 can pivot in the angular direction 8 over the aforementioned first angular movement α1 from its neutral position, without the flanges 37a of the activating part 37 abutting against the ends of the indentations 33c of the activating tubular casing, and the ends of the indentations 33c of the activating tubular casing abut against the flanges 37a of the activating part 37 and then rotate the connecting bar 7 as soon as the activating tubular casing 33 has made up a small angular clearance α0 (for example of the order of 6°) from its neutral angular position in the angular direction 8.

Furthermore, the memorisation device 32 comprises an indicator 38 (see FIGS. 5 and 9) which is in the form of a sheet metal plate extending perpendicularly to the axis X and sliding radially in a vertical guide 39 made by fitting (semi-cut-out) in the internal face of the fixed web 28.

The indicator 38 comprises a peg 40 which projects axially toward the movable web 39 and a stand 41 which also projects axially toward the movable web 29 from the peg 40.

Furthermore, the memorisation device 32 comprises moreover a memorisation insert 42 (see FIGS. 5 and 8) which is in the form of a sheet metal plate extending perpendicularly to the axis X and which is placed against the internal face of the fixed web 28.

The memorisation insert 42 comprises a central hole 43 which is mounted with radial clearance on the body 33a of the activating tubular casing 33, the insert 42 comprising a tooth 44 which projects axially downward, towards the inside of the hole 43 and which has a section approximately complementary to the section of the axial groove 35 of the activating tubular casing. This tooth 44 is engaged at the bottom of the groove 35 because of the weight of the memorisation insert 42 when the activating tubular casing 33 is in its neutral position.

Furthermore, the memorisation insert comprises a circular arc cut-out 45 which is centred on the axis X and which can slide on the peg 40 of the indicator 38. This cut-out is extended radially outwards, at one of its ends, by a radial notch 46 in which is engaged the peg 40 of the indicator 38 when the memorisation mechanism 9 is in its neutral position.

The memorisation insert 42 comprises moreover external teeth 47 which are directed upwards and placed approximately to correspond with the notch 46, these teeth 47 being adapted to mesh with internal teeth 48 of the movable web 29, by the cam entering the tooth 44 and the axial groove 35 when the tubular casing 33 pivots in the angular direction 8 from its neutral position.

In the particular example considered here, the insert 42 has the general shape of an angular sector corresponding approximately to the angular extent of the cut-out 45, and said memorisation insert 42 comprises moreover a circular arc support surface 49 which projects radially outwards near the external teeth 47, this support surface 49 having a diameter less than the external diameter of the teeth 47.

Finally, the memorisation device 32 comprises an openwork small metallic plate 50 (see FIGS. 5 and 7) extending perpendicularly to the axis X against the internal face of the movable web 29, this small plate 50 having in the example considered a general circular shape and being fixed to the tubular casing 33, for example by fitting without clearance on the body 35 of this tubular casing and engaging with the axial groove 35 of said tubular casing.

The small plate 50 comprises a cut-out 51 which extends angularly about the axis X and in which slides the stud 41 of the indicator 38, the cut-out 51 having two circular end portions 52, 53 which have different diameters and which are centred on the axis X, these end portions being connected to each other by an intermediate portion 54 extending at an angle (see FIG. 7).

The memorisation mechanism 9 which has just been described operates as follows.

When a user wishes to adjust the angular position of the back 4, he activates the handle 8 in the angular direction 8, which pivots the cams 23 of the two pivoting mechanisms 5 as well as the connecting bar 7 and the activating part 37, without the flanges 37a of said activating part 37 interfering with the ends of the indentations 33c of the activating tubular casing 33.

This activating tubular casing remains therefore in its neutral position, so that the memorisation insert 42 remains in it withdrawn position where its teeth 47 do not engage with the internal teeth 48 of the movable web 29, the stud 41 of the slider 38 being furthermore located in the largest diameter end portion 52 of the cut-out 51, so that the peg 40 is engaged in the notch 46 of the memorisation insert and holds this insert fixed with the fixed web 28, during adjustment of the back, whereas the movable web follows the movement of the back.

When a user wishes to fold down the back 4 forwards, for example to access the rear places of the vehicle if it concerns an automobile vehicle with two side doors, this user activate the lever 11 in the direction of the arrow 13 (see FIGS. 1 and 2), which pivots the small rod 36 and the activating tubular casing 33 in the angular direction 8.

At first, the activating tubular casing 33 takes up the aforementioned angular clearance α0, so that the ends of the indentations 33c of said tubular casing come into contact with the flanges 37a of the activating part 37 and cause pivoting of said activating part 37, the connecting bar 7 and the cams 23 of the two pivoting mechanisms 5, in the angular direction 8.

During this movement, the internal tooth 44 of the memorisation insert engages with the groove 35 of the tubular casing 33 by cam action until said tooth 44 is on the external circular part of the body 33a of said tubular casing, which makes the memorisation insert 42 slide upwards relative to the peg 40 of the indicator 38, until the teeth 47 of the insert 42 mesh with the internal teeth 48 of the movable web 29, the support surface 49 of the insert 42 then also coming into support against the internal teeth 48 to facilitate the meshing of the teeth 47 and 48.

The activating tubular casing 33 has then travelled a second angular path α2 which can have a value for example of about 8° from its neutral position.

It will be noted that in the position shown in FIG. 10, the stud 41 of the indicator 38 is still in the largest diameter circular position 52 of the cut-out 51, so that the indicator 38 has not moved. Furthermore, the two pivoting mechanisms 5 are then still locked.

In following the activating movement of the lever 11, the activating tubular casing 33 continues to pivot in the angular direction 8 driving with it the activating part 37, the connecting bar 7 and the cams 23, to the end of travel position shown on FIGS. 11 and 12, where the activating tubular casing 33 has pivoted, from the portion of FIG. 10, on a third angular path α3 which can be for example of the order of 36°.

This third angular path α3 is such that the angle α2+α3−α0 is greater than α1, so that the cams 23 of the pivoting mechanisms are then in their activating position, where said pivoting mechanisms are unlocked.

Furthermore, as can be seen in FIG. 12, the stud 41 of the indicator 38 is then in the smallest diameter circular position 53 of the cut-out 51, so that the indicator 38 has slid radially inwards in its guide 39 by engagement between the studs 41 and the intermediate portion 54 of said cut-out 51.

The peg 40 is then connected with the circular cut-out 45 of the memorisation insert 42, so that it is possible to tip the back 4 of the seat in the folding down angular direction R, opposite to the activating angular direction 8.

As shown in FIG. 13, the memorisation insert 42 follows this movement until the peg 40 abuts against the end of this cut-out 45 which is opposite the notch 46.

As soon as the back has started to pivot in the direction R, if the user releases the lever, the intermediate portion 54 of the cut-out 51 abuts against the stud 41 of the indicator 38, which is immobilised by the engagement of the stud 40 in the cut-out 45. Thus, the stud 41 of the indicator 38 holds the open-work small plate 50 and the activating tubular casing 33 in their activating position after a slight backward movement, as shown in FIGS. 14 and 15.

Because of the engagement between the flanges 37a of the activating part 37 and the ends of the indentations 33c of the activating tubular casing, the cam 23 of the pivoting mechanisms also remain in their activating position, so that the pivoting mechanisms 5 remain unlocked.

When the user sets the back 4 upright to its initial position, i.e. the last angular position adjusted by the user, the peg 40 comes opposite the notch 46 of the memorisation insert, which allows the small plate 50 to slide the indicator 58 upwards under the effect of the cam between the stud 41 and the intermediate portion 54 of the cut-out 51.

The memorisation mechanism 9 then returns into its neutral position shown in FIGS. 6 to 9 under the action of the spring 12 of the lever 11, the memorisation insert 42 returning into its withdrawn position by gravity whereas the pivoting mechanisms 5 re-lock under the action of their internal springs 24.

Of course, the invention is not limited to the particular example which has just been described. It encompasses on the contrary all its variants, and particularly those in which the memorisation mechanism 9 would be connected to a single pivoting mechanism 5, the mechanisms 5 and 9 being then placed either both on the same side of the seat, or on the two sides of the seat respectively.

I claim:

1. A vehicle seat comprising:
   first and second seat components pivotally mounted relative to each other about a rotational axis,
   at least one first pivoting mechanism which comprises a locking device movable between a locked position preventing the relative pivoting between the first and second seat components and an unlocked position allowing a free pivoting between the first and second seat components, this locking device being controlled by a first operating part pivoting about said rotational axis and able to be activated by a user, this first operating part being assisted to a neutral angular position where said first operating part places the locking device into its locked position, and the first operating part being movable in an activating angular direction to an angular activating position where said first operating part places the locking device into its unlocked position, the neutral and activating positions of the first operating part being fixed relative to the first seat component,
   and an memorization mechanism which is movable between a neutral position where said memorization mechanism is adapted to not interfere with the relative pivoting of the first and second seat components, and an active position where said memorization mechanism is adapted to:
      allow a free pivoting of the first seat component relative to the second seat component, only in a first angular direction from the last relative adjusted position of these two seat components,
      then to allow a free pivoting of the first seat component relative to the second seat component, in a second angular direction opposite to the first angular direction, only as far as said last relative adjusted position of these two seat components,
      the memorization mechanism being controlled by a second operating part pivotally mounted and able to be activated by a user, this second operating part being assisted to a neutral angular position where said second operating part places the memorization mechanism into its neutral position, and the second operating part being movable in said activating angular direction to an activating angular position where said second operating part places the memorization mechanism in its active position,
   wherein the memorization mechanism is distinct from the first pivoting mechanism,
   wherein the first and second operating parts are connected together by a lost motion mechanical connection which is adapted:
      to leave fixed the second operating part when the first operating part is acted upon to move it into its activating position,
      and to drive the first operating part from its neutral position to its activating position when the second operating part is acted upon to move it from its neutral position to its activating position,
   and wherein the angular neutral and activating positions of the second operating part are fixed relative to the first seat component.

2. A seat according to claim 1, wherein the memorization mechanism includes:
   first and second webs fixed respectively to the first and second seat components, these webs being pivotally mounted relative to each other about the rotational axis,
   a memorization device which is controlled by the second operating part and which is mechanically connected to the first and second webs of the memorization mechanism, this memorization device being movable between:
      a neutral position which corresponds to the neutral position of the memorization mechanism and in which the memorization mechanism defines a relative angular memorization position between the first and second webs of the memorization mechanism,
      and an activating position which corresponds to the active position of the memorization mechanism,
   the memorization mechanism being adapted to hold the second operating part in its activating position as soon as this second operating part has reached its activating position, while the two webs of the memorization mechanism are not in their relative memorization position.

3. A seat according to claim 2, wherein the second web of the memorization mechanism is fixed to teeth which extend over at least one circular arc centered on the rotational axis, the operating part of the memorization mechanism comprising a cam, and the memorization device including:
   at least one memorization insert provided with teeth suitable for engaging with the teeth of the second web of the memorization mechanism, this insert being movable between an engagement position where the teeth of the memorization insert mesh with the teeth of the second web, and a withdrawn position where the memorization insert does not engage with the teeth of the second web, the movement of the memorization insert being controlled by the cam, which is adapted to:
      allow said memorization insert to be placed in its withdrawn position when said cam is in a neutral position,
      and to place the memorization insert into its engagement position when said cam is in an activating position,
      disengagement means to place the memorization insert into its withdrawn position when the cam is in its neutral position,
   a guide part radially movable relative to the first web of the memorization mechanism, between, on one hand, a first position in which said guide part engages with the memorization insert to allow only a radial sliding of this memorization insert, and on another hand, a second position in which the guide part allows a rotation of the memorization insert about the rotational axis of the back when said memorization insert is in its engagement position, the memorization insert and the guide part defining said relative angular memorization position of the first and second webs of the memorization mechanism when the guide part is in its first position, said guide part engaging by abutting with the memorization insert to allow only a rotation of said memorization insert in said first angular direction relative to the first web from said memorization position of the memorization insert when the guide part is in its second position, and the memorization insert being adapted to prevent the guide part from returning into its first position when the first and second webs are not longer in their angular memorization position, and driving means mechanically connected with the cam, to place the guide part into its first position when the cam is in an angular position between its neutral position and its activating position, and to place said guide part into its second position at least when the second cam is in its activating position.

4. A seat according to claim 3, wherein the cam and the lost motion mechanical connection are adapted so that the memorization insert is placed into its engagement position before the first operating part reaches its activating position when the cam is acted upon to move it to its activating position.

5. A seat according to claim 3, wherein the activating angular direction is opposite the first angular direction.

6. A seat according to claim 3, wherein the guide part is vertically movable relative to said first web and engages with the memorization insert to allow a vertical sliding of this memorization insert when the cam is moved between its neutral position and its activating position, the teeth of the memorization insert being normally directed upwards and the disengagement means including at least the weight of the memorization insert.

7. A seat according to claim 3, wherein the guide part includes a peg which is engaged in a radial notch integral with the memorization insert when the second cam is in its neutral position, this radial notch communicating with a circular arc cut-out which is also integral with the memorization insert and which is centered on the rotational axis, which circular arc cut-out extends in an angular direction opposite to the activating angular direction from one end placed to correspond with the radial notch.

8. A seat according to claim 7, wherein the memorization insert is a rigid plate which extends perpendicularly to the rotational axis, the radial notch and the circular arc cut-out being formed in this rigid plate.

9. A seat according to claim 3, wherein the driving means of the guide part include a runner which is fixed to the cam and along which the guide part slides.

10. A seat according to claim 9, wherein said runner is a cut-out made in a small rigid plate which extends perpendicularly to the rotational axis, the guide part comprising a projecting stud which is guided in said cut-out.

11. A seat according to claim 3, wherein the cam has a circular external surface associated with an indentation, the memorization insert comprising an internal tooth which is placed in said indentation when the cam is in its neutral position, and which is in contact with the circular external surface of the cam when said cam is in its activating angular position.

12. A seat according to claim 1, comprising a seat part and a back which constitute respectively the first and second seat components.

13. A seat according to claim 12, comprising first and second opposite sides, the first pivoting mechanism being placed on the first side of the seat, and the seat comprising moreover, on its second side, a second pivoting mechanism which comprises a locking device movable between a locked position preventing the relative pivoting between the first and second seat components, and an unlocked position allowing a free pivoting between the first and second seat components, this locking device being controlled by a third operating part pivoting about said rotational axis and able to be activated by a user, this third operating part being assisted to a neutral angular position where said third operating part places the locking device into its locked position, and the third operating part being movable to an activating angular position where said third operating part places the locking device into its unlocked position, the neutral and activating angular positions of the third operating part being fixed relative to the first seat component, the second pivoting mechanism being synchronised with the first pivoting mechanism by means of a transverse connecting bar, so that the first and third operating parts are simultaneously, either in their neutral position, or in their activating position, and the memorization mechanism engaging with the connecting bar by means of said lost motion mechanical connection.

* * * * *